No. 677,401. Patented July 2, 1901.
T. B. DOOLEY.
EQUALIZING MECHANISM FOR VEHICLE WHEELS.
(Application filed Apr. 27, 1900.)
(No Model.)

Witnesses:
Walter E. Lombard.
Annie J. Dailey.

Inventor:
Thomas B. Dooley,
by Crosley & Davis
Attys.

UNITED STATES PATENT OFFICE.

THOMAS B. DOOLEY, OF MALDEN, MASSACHUSETTS, ASSIGNOR TO EVERETT D. WIGGIN, TRUSTEE, OF BOSTON, MASSACHUSETTS.

EQUALIZING MECHANISM FOR VEHICLE-WHEELS.

SPECIFICATION forming part of Letters Patent No. 677,401, dated July 2, 1901.

Application filed April 27, 1900. Serial No. 14,569. (No model.)

*To all whom it may concern:*

Be it known that I, THOMAS B. DOOLEY, of Malden, in the county of Middlesex and State of Massachusetts, have invented certain new and useful Improvements in Equalizing Mechanism for Vehicle-Wheels, of which the following is a description sufficiently full, clear, and exact to enable those skilled in the art to which it appertains or with which it is most nearly connected to make and use the same.

My invention has relation for the most part to equalizing mechanism for vehicles and trucks—that is, to mechanism employed on a divided axle to the ends of which wheels are secured so that each of the wheels may turn to any extent or degree required without regard to the turning of the other wheel and to keep the two divided ends of the axle or shaft in perfect alinement, so that there shall be no binding effect between the two parts and their supports.

The invention consists in providing the gears through which the differential speed is secured and other supports with sleeve-bearings for the inner ends of the shaft or axle and providing said sleeves with roller-bearings, all as will be presently described and claimed.

Reference is to be had to the annexed drawings and to the letters marked thereon, forming a part of this specification, the same letters designating the same parts or features, as the case may be, wherever they occur.

Figure 1:
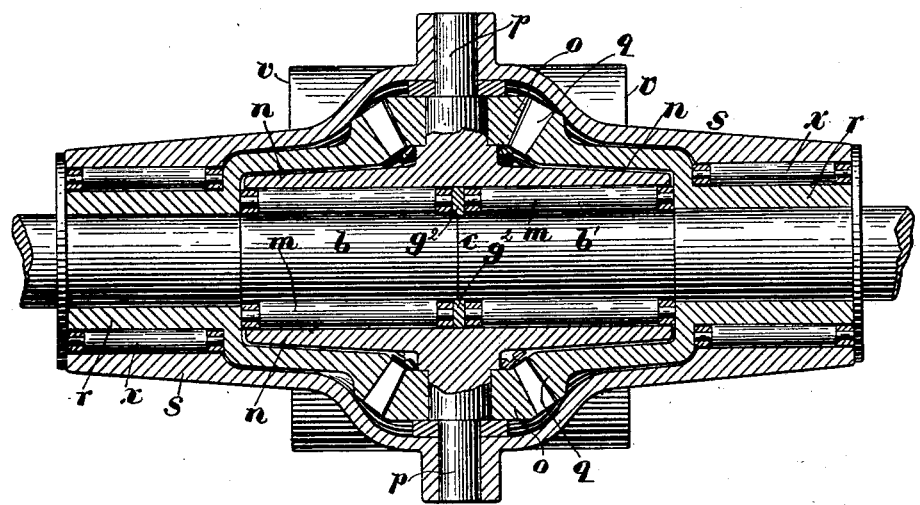
Figure 2:
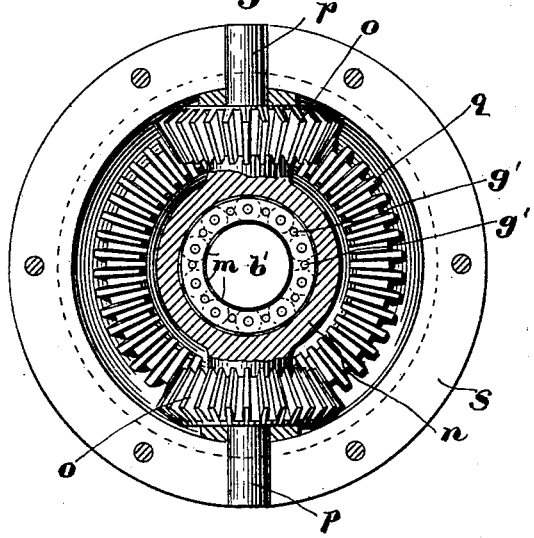

Of the drawings, Figure 1 is a central longitudinal sectional view through the equalizing mechanism. Fig. 2 is a transverse central sectional view of what is shown in Fig. 1.

In the drawings, $b$ $b'$ are the parts of the axle to the outer ends of which the wheels are secured.

$c$ indicates the line upon which the axle or shaft is divided. The inner ends of the divided axle run upon rollers $m$, interposed between the said inner ends and a sleeve $n$, surrounding them and formed with radial studs $p$, on which bevel gears or pinions $o$ are journaled, the studs occupying bosses formed by central flanges of the casing surrounding the entire equalizing device. Gears $q$, which engage the gears $o$ and surround the sleeve $n$, themselves have sleeves $r$, which extend out and down upon the axle or shaft and are shrunk thereon, keyed thereto, or otherwise secured so that they turn with the axle.

Interposed between the outer ends of the sleeves $r$ and the outer ends of the casing $s$ are antifriction-rollers $x$, which form the bearing between the said two parts, so that the antifriction-rollers $m$ and $x$, which practically extend from one end of the casing to the other, form an antifriction-bearing for the device throughout, and the two parts of the casing being firmly bolted together the ends of the axle are held in perfect alinement, while they may turn in their bearings with the greatest of ease.

The casing is enlarged at its center and is formed with flanges $v$ $v$, to which gear-wheels may be bolted.

The whole forms a compact and highly-efficient equalizing mechanism for automobiles and similar vehicles and devices where equalizing means are employed.

The antifriction-rollers are employed in series around the axle and sleeve, being separated by the usual spacing-rods $g'$, as is clearly shown in end view in Fig. 2.

A rawhide or similar ring $g^2$, employed as a spacing-ring, surrounds the ends of the shaft members centrally between the rings in which the ends of the rollers $m$ are journaled.

Having thus explained the nature of the invention and described a way of constructing and using the same, though without attempting to set forth all of the forms in which it may be made or all of the modes of its use, it is declared that what is claimed is—

The combination with a divided shaft or axle; of a sleeve embracing the meeting ends thereof and having radial studs; roller-bearings interposed between the said sleeve and the shaft on each side of the dividing-line thereof; bevel-pinions journaled on the said radial studs; gears engaging said pinions and embracing the ends of the sleeve and formed beyond the latter with sleeve portions embracing the shaft members respectively and secured thereto; a sectional casing embracing the gears and having bosses for the radial studs; and roller-bearings interposed between the said casing and the sleeve portions of the gears, substantially as described.

In testimony whereof I have signed my name to this specification, in the presence of two subscribing witnesses, this 21st day of April, A. D. 1900.

THOMAS B. DOOLEY.

Witnesses:
ARTHUR W. CROSSLEY,
ANNIE J. DAILEY.